No. 833,245. PATENTED OCT. 16, 1906.
T. F. ROWLAND.
PROCESS OF MAKING WELDED SHELLS.
APPLICATION FILED MAY 3, 1902.

Witnesses:
Raphael Netter
Alexander Mitchell

Inventor
Thomas F Rowland
By Frederick S Duncan Atty

UNITED STATES PATENT OFFICE.

THOMAS F. ROWLAND, OF NEW YORK, N. Y.

PROCESS OF MAKING WELDED SHELLS.

No. 833,245.   Specification of Letters Patent.   Patented Oct. 16, 1906.

Application filed May 3, 1902. Serial No. 105,752.

*To all whom it may concern:*

Be it known that I, THOMAS F. ROWLAND, a citizen of the United States, and a resident of New York city, in the county and State of New York, have invented certain new and useful Improvements in Processes of Making Welded Shells, of which the following is a specification, taken in connection with the accompanying drawings, which form a part of the same.

This invention relates to welded shells, and more particularly relates to the forming of welded bosses upon said shells to form attaching members on the same, so that parts may be secured to said shells without allowing leakage at the point of attachment.

Figure 1:
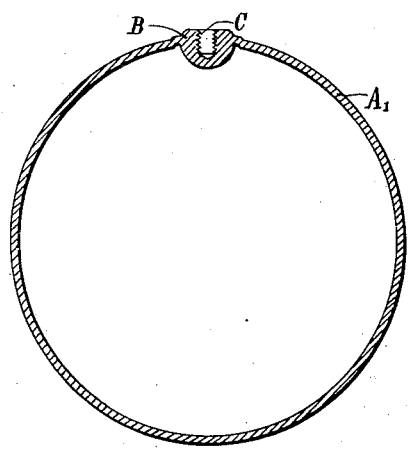
Figure 2:
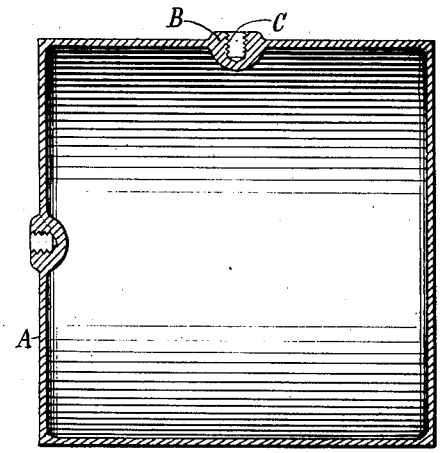
Figure 3:
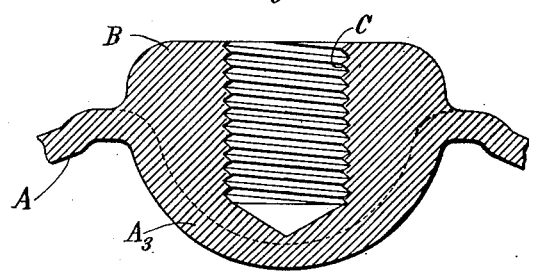
Figure 4:
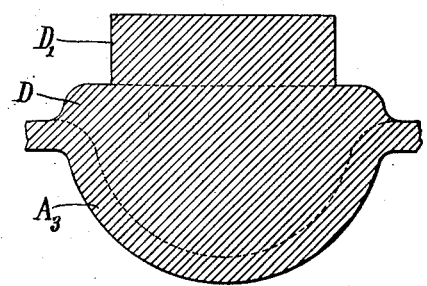

In the accompanying drawings, in which the same reference character refers to similar parts in the several figures, Figure 1 is a sectional view of a welded shell embodying this invention. Fig. 2 is a sectional view of a modified form of shell. Figs. 3 and 4 show details of construction.

In Fig. 1 the cylindrical shell A' is formed with the thickened attaching member or boss B, and a tapped hole C is shown in this boss. In Fig. 2 the shell A is shown having a closed cylindrical formation, there being similar threaded bosses in this shell. As shown in Fig. 3, the button B is welded to the shell A by forming the depression $A^3$ in the shell and then welding the parts together, the line of weld being indicated by the dotted line in that figure, so as to form an enlarged attaching member or boss at this point. The hole C in the boss is then made and tapped in the ordinary manner, this hole extending sufficiently into the boss to give a firm connection with the shell and yet not extending through the same, so that under no circumstances can leakage of fluids take place past the threads of the screw and through the shell. In this case the threaded hole C is entirely within the button and does not extend into the material of the shell, which in this instance is imperforate. In such a case as this, therefore, leakage is absolutely prevented, since the wall of the shell is maintained intact and the threaded hole is entirely within the button, which is welded upon the shell. It is of course understood that the extent to which the attaching-boss protrudes from the shell on either side of the same is immaterial, and, if desired, the shell may be formed with a smooth surface on one side of the same, the boss projecting from the other side to a correspondingly greater extent. It is also understood that the attaching-boss need not be formed with a hole such as indicated in Fig. 3. Fig. 4 shows a button welded into a depression $A^3$ in a shell, this attaching-button D being formed with an attaching-shoulder D'. In forming the bosses on shells of this character a suitable depression is preferably made in the shell, the shell and the button or blank brought to a welding heat, and then the weld effected by any suitable means. The button may be pressed into a depression in the shell by hydraulic pressure or otherwise, the shell being supported by a suitable die on the other side.

This invention is of especial value in connection with shells which are to contain liquids and gases under pressure, since it provides a convenient means of attaching various fittings to these shells and at the same time preventing the leakage of fluid through the shell. Shells of this description are useful for storing fluids under great pressure and for many other purposes.

Modifications may be made in the construction and operation of this invention by those familiar in this art. Furthermore, parts of this invention may be employed without using all of the same. I do not, therefore, wish to be limited to the disclosure which I have made in this case; but—

What I claim as new, and what I wish to secure by Letters Patent, is set forth in the appended claims:

1. The process of forming attaching means for a shell consisting in forming depressions in the outer surfaces of the shell and attaching a button to the shell by welding the same within the depression in the shell without breaking the continuity of the metal of the shell.

2. The process of attaching supporting means to a closed metal shell which consists in forming substantially hemispherical depressions in the outer surface of the shell, forming a button of substantially hemispherical form and welding the same to that portion of the outer surface of the shell located within the hemispherical depression of the shell.

THOMAS F. ROWLAND.

Witnesses:
 WARREN E. HILL,
 CHAS. F. HATHAWAY.